United States Patent [19]

Lee

[11] 4,168,517
[45] Sep. 18, 1979

[54] CAPACITIVE PRESSURE TRANSDUCER

[76] Inventor: Shih Y. Lee, Huckleberry Hill, Lincoln, Mass. 01773

[21] Appl. No.: 850,258

[22] Filed: Nov. 10, 1977

[51] Int. Cl.² ............................................... H01G 7/00
[52] U.S. Cl. ..................... 361/283; 73/724
[58] Field of Search .................. 361/283; 73/724, 718

[56] References Cited

U.S. PATENT DOCUMENTS

| | | | |
|---|---|---|---|
| 2,667,786 | 2/1954 | Spaulding | 361/283 X |
| 3,703,828 | 11/1972 | Bullard | 73/724 X |
| 3,965,746 | 6/1976 | Rabek | 73/718 X |
| 4,040,118 | 8/1977 | Johnston | 73/718 X |

*Primary Examiner*—E. A. Goldberg
*Attorney, Agent, or Firm*—Kenway & Jenney

[57] ABSTRACT

A pressure-sensing transducer and method of construction therefor. The device includes a dielectric plate joined to the periphery of a diaphragm and having a central portion with conductive film which serves as a capacitor plate and faces the diaphragm which forms the other capacitor plate. A deep convolution formed near the rim of the diaphragm provides a relatively rigid ring-shaped structure in comparison to the relatively flexible central portion of the diaphragm. As the central portion deflects under pressure, the rigid convolution serves to prevent the motion from being transmitted to the outer rim of the diaphragm and thus to minimize hysteresis. The device further includes a relatively thin annular structure against which the dielectric plate and diaphragm are clamped directly or through the use of a clamping collar. The conductive film and diaphragm are connected to exterior terminals.

8 Claims, 2 Drawing Figures

CAPACITIVE PRESSURE TRANSDUCER

BACKGROUND OF THE INVENTION

This invention relates to pressure- or force-sensing transducers, and more particularly to capacitive pressure- or force-sensing transducers. As set forth in my copending application Ser. No. 795,617, there are many forms of pressure-sensing transducers in the prior art which utilize capacitive sensors. This copending application sets forth a high quality pressure-sensing transducer formed of two dielectric plates. While the transducer there-described and claimed is of high quality and performance, there are many present day applications for which it is desirable to have a pressure sensitive capacitor adapted for low-cost production and relatively low pressure applications.

Accordingly, it is an object of the present invention to provide a capacitive pressure transducer which may be easily fabricated at relatively low cost.

Another object is to provide a capacitive pressure transducer incorporating clamping means which minimize hysteresis effects.

A further object is to provide a capacitive pressure transducer with a diaphragm configuration which minimizes hysteresis effects.

SUMMARY OF THE INVENTION

A pressure transducer according to the present invention includes a dielectric plate having a central portion comprising a planar surface with a conducting film. This plate is clamped to a facing metallic diaphragm which has a central planar portion. Between the central planar portion of the diaphragm and the rim of the diaphragm a rather deep convolution is formed. This convolution serves to prevent motion from being transmitted to the outer rim of the diaphragm as the central portion deflects under applied pressure or pressure differential. Accordingly, hysteresis, which often occurs with clamped diaphragms and is caused by slippage at the contact surfaces, is minimized or eliminated. A relatively thin annular support to which the diaphragm and dielectric plate are clamped, either directly or by means of a clamping collar which applies pressure at the same radial distance as the annular member, further serves to minimize pressure hysteresis or thermal hysteresis effects by minimizing any slippage between the capacitive structure and the supporting member. The supporting member may deform radially to prevent such slippage.

The dielectric element may be fabricated by grinding or otherwise forming one side to a flat surface. The diaphragm may be stamped from uniform flat, metallic stock.

BRIEF DESCRIPTION OF THE DRAWINGS

The invention and its various features may be more fully understood from the following description in conjunction with the accompanying drawings in which.

DESCRIPTION OF THE PREFERRED EMBODIMENT

Figure 1:
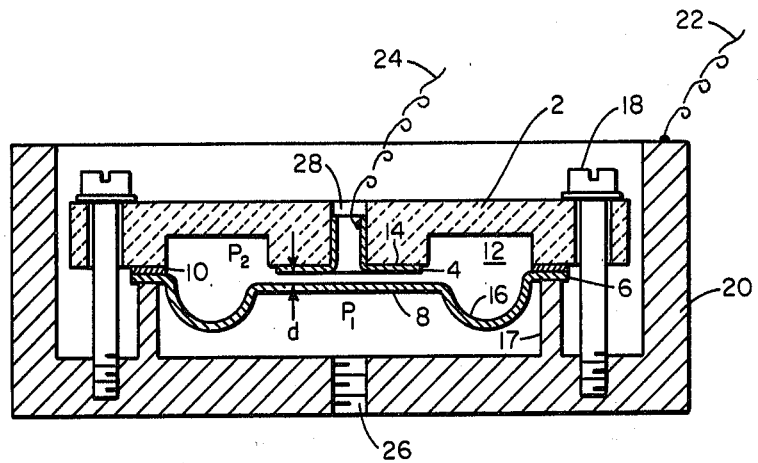
FIG. 1 is a view in cross-section of an embodiment of the present invention.

Referring now to FIG. 1, a contoured ceramic plate 2 is shown in cross-section. A central portion of the ceramic element has a conducting film 4 affixed to it. Facing the conductive film is a diaphragm 6 with a central portion 8 in plane parallel relationship to the conducting film 4. The conducting film 4 and the portion 8 provide the two plates of the capacitor. The spacing between the plates with no pressure differential applied is provided by the spacer 10. Alternatively the spacing may be provided without a spacer by forming the perimeter of the diaphragm 6 in a plane spaced from the plane of the central portion 8 by the desired separation. For more positive sealing a liquid sealant such as Loctite may be used between diaphragm 6 and support 17.

The ceramic element is shown with a recessed area 12 to provide a definitive capacitive area and to minimize undesirable resistance to fluid flow as the diaphragm deflects. With the recess the applying of the conducting film may also be simplified in that it can be applied over the entire central surface 14 which will determine the limits of the effective conductive portion. If a plane flat dielectric element 2 is used, the conducting film is applied to the desired central portion. To illustrate such application the central film 4 is shown not fully covering the central portion 14, although normally with the recessed configuration the film 4 would cover the entire central portion.

Radially outward from the central portion 8 of the diaphragm 6 there is a relatively deep convolution 16. This convolution serves a purpose quite distinct from that served by the concentric ridges sometimes found in prior art diaphragms. The shallow ridges of prior art devices are typically 3 to 5 times the thickness of the diaphragm and serve to permit increased linear pressure-deflection relationship. These relatively shallow convolutions usually do not change the effective area of the diaphragm. In the present invention the relatively deep convolution 16 provides a substantially rigid area and serves to isolate the perimeter of the diaphragm 6 from the central deflecting portion 8, decreasing the effective area of the diaphragm. In this manner any tendency of the diaphragm to slip at the area where it is clamped is minimized with a corresponding minimization of hysteresis which would be introduced by slippage. Applicant has found the convolution depth should be at least 10 times and up to 50 times the diaphragm thickness. Material characteristics normally make it impractical to form a deeper convolution.

The annular support 17 is relatively thinner than the proportions shown in the drawing. With the thin cross-section any tendency to slippage between the diaphragm and the support 17 which might be introduced by either deflection or unequal thermal expansion is minimized. If the clamped capacitive assembly should tend to expand in an outward radial direction, the relatively thin support structure 17 will deflect outwardly in a radial direction rather than causing slippage. Temperature induced slippage would produce what is called thermo hysteresis. Bolts 18 through dielectric element 2 clamp the assembly to the housing 20. In the emobidment shown the housing is of conducting materials such as metal, so that a lead 22 may be affixed to the housing 20, another lead 24 to the conductive film 4. A threaded inlet 26 is provided to admit pressure to a pressure area $P_1$ on the lower side of the diaphragm. As shown atmospheric pressure $P_2$ would be present on the other side of the diaphragm, although other connections to provide non-atmospheric pressures to both sides could be made.

As the pressure differential between the two sides of the diaphragm 6 varies, that is, $P_1-P_2$ varies, the gap d between the diaphragm 6 and the conductive film 4 will vary accordingly, resulting in a corresponding variation in the capacitance which can be sensed theough terminals 22, 24 by conventional sensing means. While not normally necessary for low-pressure applications, sealant can be used to make a pressure-tight joint between the diaphragm 6 and the support 17.

Figure 2:
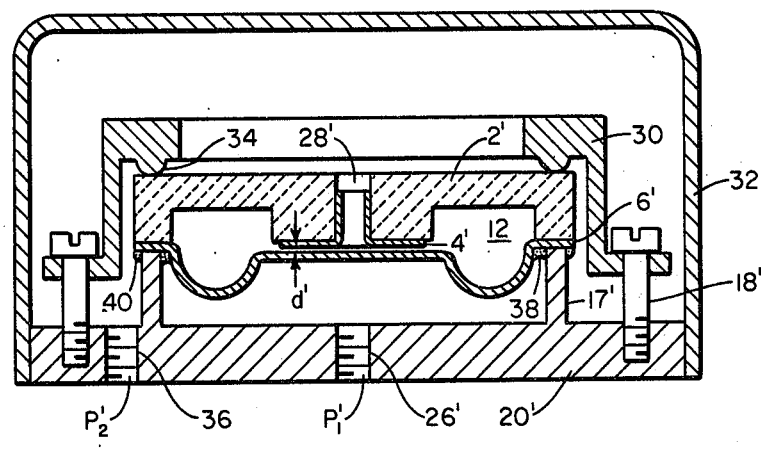
FIG. 2 is a view in cross-section of another embodiment of the present invention incorporating a clamping collar.

Referring now to FIG. 2, an embodiment to still further minimize the effects of clamping is shown. An annular clamping collar 30 is provided with an inner projecting ring 34 at the same radial distance as the relatively thin support element 17'. When clamping force is applied by bolts 18' the force is transmitted directly in line with the thin annular support element 17' so that no torque which could introduce errors through deflection or shift of the diaphragm 6' with respect to the dielectric element 2'. In the particular configuration shown the transducer is also provided with an enclosing element 32 to make it particularly adapted to the measurement of differential pressures. A pressure $P_1'$ is admitted through the threaded opening 26' and a pressure $P_2'$ is admitted through the threaded opening 36. For simplicity in the drawing, piping or other means to transfer the pressure as well as electrical leads have been omitted. Although normally not necessary for low pressure applications, sealant at annular positions 38 and 40 has been provided to insure complete separation between pressures $P_1'$ and $P_2'$.

While the thinner portion of the dielectric element 2' at the region 12' can serve to define the conducting film area, the reduction is not so great that deflection of the dielectric element sufficient to affect the spacing between the conducting film and the facing diaphragm sufficiently to cause a significant change in the capacitance value in embodiments applying differential pressure to the dielectric element. The capacitance changing deflection occurs through deflection of the diaphragm. In my copending application Ser. No. 795,617 the ceramic element is configured to be the deflecting member. In the present invention the dielectric element serves as a rigid structure. Deflection of the dielectric element would not occur in the embodiments shown in FIGS. 1 and 2 since there is free communication through aperture 28 or 28' between the two sides of the dielectric element. However in applications for measuring absolute pressure, this path may be sealed so that mechanical strength of the dielectric element is required both to withstand mounting or clamping stresses and to prevent undesirable deflection due to pressure variations.

Typically the diaphragm is fabricated of metal with good elastic and chemical properties such as heat-treatable stainless steel. Preferably the body 20 will be made of material having a thermal expansion coefficient equal to that of the diaphragm. The dielectric element 2 may be made of dielectric material such as ceramic, glass, quartz or plastic. The conductive film 4 may be sputtered onto the dielectric, thermally deposited, or deposited by any other conventional technique. It is desirable that the dielectric element have a thermal coefficient of expansion similar to that of the diaphragm and sensor body.

While specific embodiments have been shown and described, those familiar with the transducer art will recognize that variations may be made to meet the needs of particular applications. For example, aperture 28 in FIG. 1 may be sealed to provide a transducer responsive to absolute pressure applied through aperture 26.

Specific electrical circuitry for sensing and utilizing the variations in capacitance has not been shown. However, they may be conventional measurement systems, such as that described in Lee and Li U.S. Pat. No. 3,518,536 or in U.S. Pat. No. 4,054,833 of Dennis K. Briefer. The particular circuit performance characteristics desired will depend upon the use which is to be made of the data. Such use may vary widely. A force or pressure measuring instrument may be desired, or the transducer may be part of an operating system wherein the change in capacitance is used to control a parameter which will affect system performance and the pressure being measured.

Having thus described my invention, I claim:

1. A pressure-sensing transducer comprising a dielectric element, said dielectric element having a central portion with a conducting surface, a metallic diaphragm, the central portion of said diaphragm facing said dielectric element and said conducting surface serving to form a capacitor, means to clamp said diaphragm and said dielectric element together at their peripheries to form an interior volume, said dielectric element and diaphragm being clamped to support means of relatively thin radially flexible cross-section, said thin cross-section serving to permit radial motion of said clamped diaphragm and element and thus to prevent the introduction of errors through slippage between said support means and the diaphragm and dielectric element when the clamped capacitive assembly tends to move radially, whereby a difference in pressure between said interior and pressure exterior to said diaphragm causes deflection of said diaphragm in the region opposite said conducting surface, the deflection causing a change in the spacing between said conducting surface and said diaphragm thus causing a change in the capacitance of the capacitor in relationship to said pressure difference.

2. A pressure-sensing transducer comprising a dielectric element, said dielectric element having a central portion with a conducting surface, a metallic diaphragm, said diaphragm having a relatively deep annular convolution between its periphery and the central portion opposite said conducting surface, said convolution having a depth at least 10 times the thickness of said diaphragm and serving to provide a substantially rigid area and thus isolate the remainder of said diaphragm from motion of the central portion of said diaphragm and thus to minimize hysteresis effects, the central portion of said diaphragm facing said dielectric element and said conducting surface serving to form a capacitor, means to clamp said diaphragm and said dielectric element together at their peripheries to form an interior volume, whereby a difference in pressure between said interior and pressure exterior to said diaphragm causes deflection of said diaphragm in the region opposite said conducting surface, the deflection causing a change in the spacing between said conducting surface and said diaphragm thus causing a change in the capacitance of the capacitor in relationship to said pressure difference.

3. A pressure-sensing transducer comprising a dielectric element, said dielectric element having a central portion with a conducting surface, a metallic diaphragm, the central portion of said diaphragm facing said dielectric element and said conducting surface serving to form a capacitor, means to clamp said diaphragm and said dielectric element together at their peripheries to form an interior volume, whereby a difference in pressure between said interior and pressure exterior to said diaphragm causes deflection of said diaphragm in the region opposite said conducting surface, the deflection causing a change in the spacing between said conducting surface and said diaphragm thus causing a change in the capacitance of the capacitor in relationship to said pressure difference, said dielectric element having an annular region of reduced cross-section with no conductive surface between said conducting surface and the region at which it is clamped to define the effective area to which the conductive surface is applied and to provide increased interior volume, said region of reduced cross-section retaining sufficient strength so that said pressure difference does not produce deflection of said dielectric element sufficient to make a significant change in the capacitance of said pressure transducer.

4. A transducer according to claim 2 wherein the depth of said convolution is 10 to 50 times the thickness of said diaphragm.

5. A transducer according to claim 1 wherein said clamping means comprises an annular collar which applies force to said dielectric element and said diaphragm at a radial position directly in line with support means against which said diaphragm and dielectric element are clamped.

6. Apparatus according to claim 1 with means to admit pressure exterior to said diaphragm and means to admit a second pressure to said interior volume.

7. A transducer according to claim 3 wherein the initial capacitance is determined by the configuration of said diaphragm with respect to said dielectric element with no applied pressure difference.

8. A transducer according to claim 3 wherein the initial capacitance value is determined by spacing means between said clamped dielectric element and diaphragm.

* * * * *